(12) United States Patent
Boutin

(10) Patent No.: US 11,120,508 B2
(45) Date of Patent: *Sep. 14, 2021

(54) HAIL DATA EVALUATION COMPUTER SYSTEM

(71) Applicant: Hartford Fire Insurance Company, Hartford, CT (US)

(72) Inventor: Seth J. Boutin, Branford, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,948

(22) Filed: Mar. 15, 2019

(65) Prior Publication Data

US 2019/0213688 A1 Jul. 11, 2019

Related U.S. Application Data

(63) Continuation of application No. 14/656,935, filed on Mar. 13, 2015, now Pat. No. 10,235,716.

(51) Int. Cl.
*G06Q 40/08* (2012.01)
*G06F 16/23* (2019.01)
*G06F 16/29* (2019.01)
*G06F 16/955* (2019.01)

(52) U.S. Cl.
CPC .......... *G06Q 40/08* (2013.01); *G06F 16/23* (2019.01); *G06F 16/29* (2019.01); *G06F 16/955* (2019.01)

(58) Field of Classification Search
USPC .......................................................... 705/4
See application file for complete search history.

(56) References Cited

U.S. PATENT DOCUMENTS

| 8,046,245 | B1 | 10/2011 | Woll et al. |
| 8,504,393 | B2 | 8/2013 | Stewart et al. |
| 2007/0016542 | A1* | 1/2007 | Rosauer ............. G06N 5/022 706/21 |

(Continued)

OTHER PUBLICATIONS

Insurance Blow in Hail Losses: Claims So Far Exceed Record of 1915, When Ratios Ran Above 100 Pet.; Cartwright, C. M.; Chicago Daily Tribune (1872-1922); Chicago, IL Jul. 10, 1916; 14.

(Continued)

*Primary Examiner* — Hani M Kazimi
*Assistant Examiner* — Hatem M Ali
(74) *Attorney, Agent, or Firm* — Howard IP Law Group, PC (57) ABSTRACT

According to some embodiments, a hail history storage device may store information periodically received from a remote third-party weather reporting service. A hail history score request associated with a geographic location and a date range may be received from a remote requester device. Responsive to the received hail history score request, a computer processor of a hail history server may automatically access information in the hail history storage device based on the geographic location and date range. Moreover, the computer processor may automatically evaluate accessed information to calculate a hail history score value. The computer processor may then transmit, to the remote requester device, historical hail evaluation data including the calculated hail history score value.

16 Claims, 10 Drawing Sheets

(56) References Cited

U.S. PATENT DOCUMENTS

| | | | | |
|---|---|---|---|---|
| 2007/0214023 | A1* | 9/2007 | Mathai | G06F 16/29 |
| | | | | 705/4 |
| 2013/0226624 | A1* | 8/2013 | Blessman | H04N 7/183 |
| | | | | 705/4 |
| 2013/0325520 | A1 | 12/2013 | Stewart et al. | |
| 2014/0007703 | A1* | 1/2014 | Martin | E04B 7/18 |
| | | | | 73/862.621 |
| 2014/0149151 | A1 | 5/2014 | Chen et al. | |
| 2014/0176362 | A1* | 6/2014 | Sneed | G01S 13/87 |
| | | | | 342/26 R |
| 2014/0180723 | A1 | 6/2014 | Cote et al. | |
| 2014/0245210 | A1 | 8/2014 | Battcher et al. | |
| 2014/0310162 | A1 | 10/2014 | Collins | |
| 2015/0302529 | A1 | 10/2015 | Jagannathan | |
| 2016/0048923 | A1 | 2/2016 | Maher et al. | |

OTHER PUBLICATIONS

Data and Approaches for Determining Hail Risk in the Contigous . . . https://journals.ametsoc.org/doi/pfd/10.1175/1520-0420%281999%29038%3C1730%3ADAAFDH%E2.0.CO%3B2.
Evaluating Hail Damage using Property Insurance Data . . . https://journals.ametsoc.org/doi/full/10.1175/WCAS-D-15-0011.1.
Curiosities of Insurance: Secure Against Hail Losses. Chances on Marconi. Chicago Daily Tribune (1872-1922) Chicago. IL Mar. 13, 1902: 13.

* cited by examiner

Browser by Worldscape http://www.hail_history_request.com

HAIL HISTORY REQUEST

Request Details
Requester ID: 12345

Hail Location Criteria
Choose one of the following: ○ File (multiple locations) ● Address ○ Lat/Long
Street Address: _____________
City: _____________
State: ___
ZIP Code: _____

— 310

Hail History Request Criteria
Hail Period Start Date: 01/01/2010    Start Date Association: Date Roof Repaired
Hail Period End Date: 01/01/2015    End Date Association: Current Date

320

Minimum Hail Size (inches): [All sizes ▽]

[ SUBMIT ]    [ CLEAR ]

Browser by Worldscape http://www.hail_history_report.com

HAIL HISTORY REPORT

Request Details
Requester ID: 12345     Date: 01/01/2015     Request ID: R_101

Hail Location Criteria
Street Address: 690 Asylum Ave.
City: Hartford
State: CT  ZIP Code: 06155

Hail History Request Criteria
Hail Period Start Date: 01/01/2010
(Date Roof Repaired)
Hail Period End Date: 01/01/2015
(Current Date)
Minimum Hail Size (inches): All Sizes

Results
Prior Hail Damage Risk Score: 1
Hail Occurrence Date: 06/26/2014     Hail Size (inches): 1    — 410

Notes: 1 = lowest probability of hail damage, 5 = highest probability of hail damage

NEW

HAIL DATA EVALUATION COMPUTER SYSTEM

CROSS-REFERENCE TO RELATED APPLICATIONS

This application is a continuation application of co-pending U.S. patent application Ser. No. 14/656,935 entitled "System for Generating Historical Hail Evaluation Data" and filed on Mar. 13, 2015, the entire contents of which is incorporated herein by reference for all purposes.

FIELD

The present invention relates to computer systems and, more particularly, to computer systems associated with hail history evaluation data.

BACKGROUND

An insurer may provide insurance to a business or homeowner to protect against possible damage caused by hail storms. For example, hail may damage a roof, windows, etc. and the risks associated with these types of damages might be covered by an insurance policy. In some cases, the insurer may want to determine whether a new insurance policy is associated with a property that was relatively likely to have previously sustained substantial hail damage. That is, if the insurer determines that prior damage to a roof is very likely to exist (e.g., because of a hail storm that occurred last year), then an inspection of the roof might be warranted before the new insurance policy is issued. Similarly, an insurer might want to verify that a particular property actually experienced a hail storm on a particular date in connection with an insurance claim that is being evaluated.

Hail storms, however, can be a very localized phenomena. One property might sustain substantial hail damage while another nearby property might not experience any damage at all. Moreover, different sizes of hail can cause different types and amounts of damages. It can be difficult, therefore to properly assess the likelihood of hail damage for a particular property. It would therefore be desirable to provide systems and methods to facilitate generation of historical hail evaluation data in an automated, efficient, and accurate manner.

SUMMARY

According to some embodiments, systems, methods, apparatus, computer program code and means may facilitate generation of historical hail evaluation data. In some embodiments, a hail history score request associated with a geographic location and a date range may be received from a remote requester device. Responsive to the received hail history score request, a computer processor of a hail history server may automatically access information in a hail history storage device based on the geographic location and the date range, the hail history storage device storing information periodically received from a remote third-party weather reporting service. Moreover, the computer processor of the hail history server may automatically evaluate the accessed information to calculate a hail history score value. The computer processor of the hail history server may then transmit, to the remote requester device, historical hail evaluation data including the calculated hail history score value.

Some embodiments provide: means for receiving, from a remote requester device, a hail history score request associated with: (i) a geographic location, and (ii) a date range; responsive to the received hail history score request, means for automatically accessing, by a computer processor of a hail history server, information in a hail history storage device based on the geographic location and the date range, the hail history storage device storing information periodically received from a remote third-party weather reporting service; means for automatically evaluating, by the computer processor of the hail history server, the accessed information to calculate a hail history score value; and means for transmitting, from the computer processor of the hail history server to the remote requester device, historical hail evaluation data including the calculated hail history score value.

A technical effect of some embodiments of the invention is an improved and computerized method to facilitate generation of historical hail evaluation data. With these and other advantages and features that will become hereinafter apparent, a more complete understanding of the nature of the invention can be obtained by referring to the following detailed description and to the drawings appended hereto.

DETAILED DESCRIPTION

An insurer may provide insurance to a business or homeowner to protect against possible damage caused by hail storms. In some cases, the insurer may want to determine whether a new insurance policy is associated with a property that was relatively likely to have previously sustained substantial hail damage. Similarly, an insurer might want to verify that a particular property actually experienced a hail storm on a particular date in connection with an insurance claim that is being evaluated.

Figure 1A:
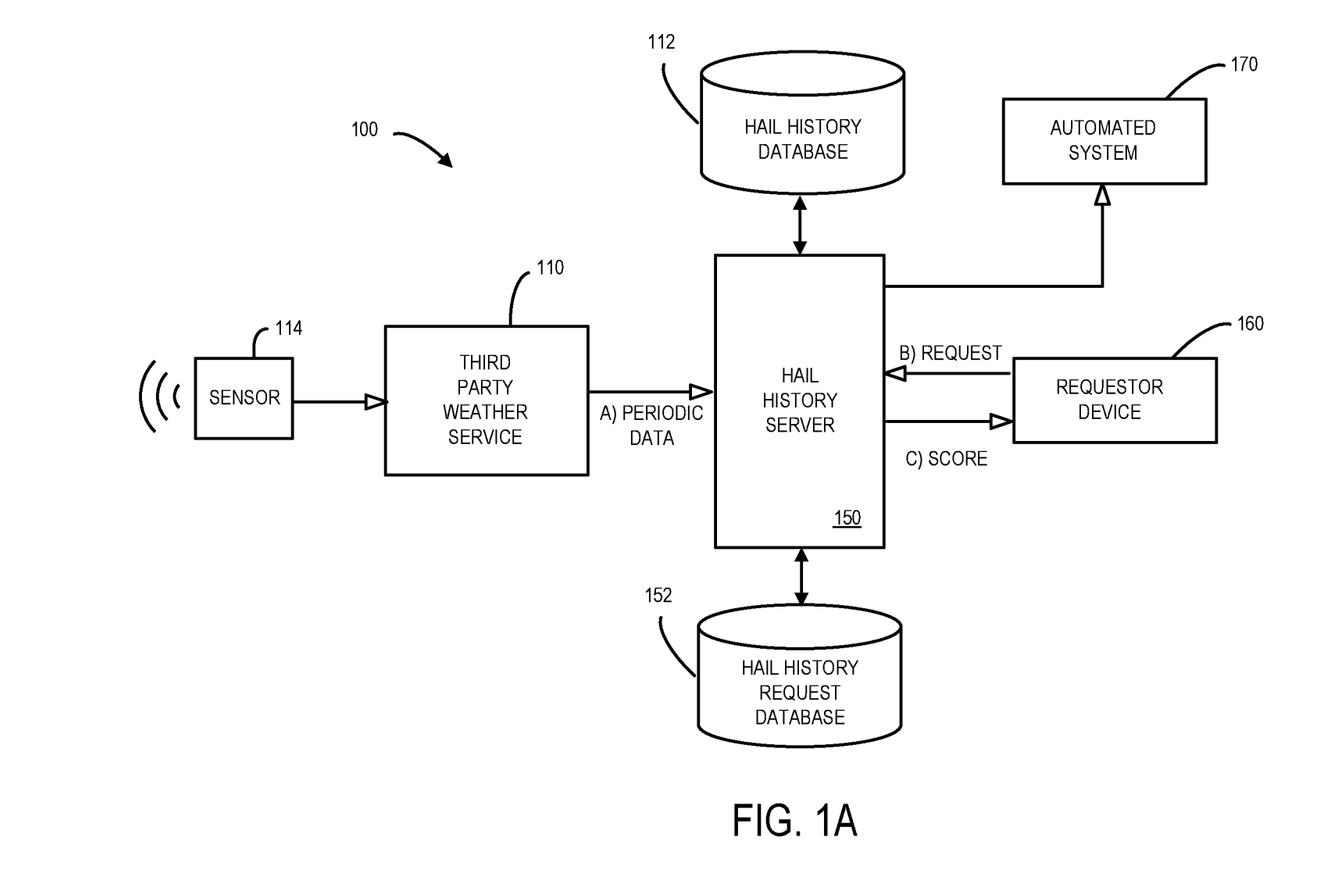
FIG. 1A is block diagram of a system according to some embodiments of the present invention.

Hail storms, however, can be an extremely localized phenomena. Moreover, different sizes of hail can cause different types and amounts of damages. It can be difficult, therefore to properly assess the likelihood of hail damage for a particular property. It would therefore be desirable to provide systems and methods to facilitate generation of historical hail evaluation data in an automated, efficient, and accurate manner. FIG. 1A is block diagram of a system 100 according to some embodiments of the present invention. In particular, the system 100 includes a hail history server 150 that may access a third party weather service 110. The third party weather service 110 may periodically transmit (e.g., on a daily basis) information about hail storms to hail history server 150 at A. The hail history server 150 may, for example, store this information in a hail history database 112. The information about hail storms might be gathered, for example, by a sensor 114 such as a set of radar antennas located throughout the United States.

The hail history server 150 may receive a request at B from a requestor device 160. For example, an underwriter or claim handler might submit the request to the hail history server 150. According to some embodiments, information about received requests may be stored at a hail history request database 152. Responsive to the request, the hail history server 150 might access information in the hail history database 112 (e.g., associated with prior hail storms). The hail history server 150 may then evaluate the accessed information and transmit historical hail evaluation data, including a risk score, to the requestor device 160 at C.

The hail history server 150 and/or requestor device 160 might be, for example, associated with a Personal Computer (PC), laptop computer, an enterprise server, a server farm, and/or a database or similar storage devices. The hail history server 150 may, according to some embodiments, be associated with an insurance provider.

According to some embodiments, an "automated" hail history server 150 may facilitate the provision of hail history reports including at least one risk score. For example, the hail history server 150 may automatically generate and email an email indicating that a particular property is "highly" likely to have recently experienced substantial hail damage. As used herein, the term "automated" may refer to, for example, actions that can be performed with little (or no) intervention by a human.

As used herein, devices, including those associated with the hail history server 150 and any other device described herein may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The hail history server 150 may store information into and/or retrieve information from the hail history request database 152. The hail history request database 152 might be associated with, for example, an insurance company, an underwriter, or a claim analysis and might also store data associated with past and current insurance claims. The hail history request database 152 may be locally stored or reside remote from the hail history server 150. As will be described further below, the hail history request database 152 may be used by the hail history server 150 to generate and/or calculate risk scores. According to some embodiments, the hail history server 150 communicates information about risk scores to an automated system 160, such as by transmitting an electronic file to an underwriter device, an insurance agent or analyst platform, an email server, a workflow management system, a predictive model, etc.

Although a single hail history server 150 is shown in FIG. 1A, any number of such devices may be included. Moreover, various devices described herein might be combined according to embodiments of the present invention. For example, in some embodiments, the hail history server 150 and hail history request database 152 might be co-located and/or may comprise a single apparatus.

Figure 1B:
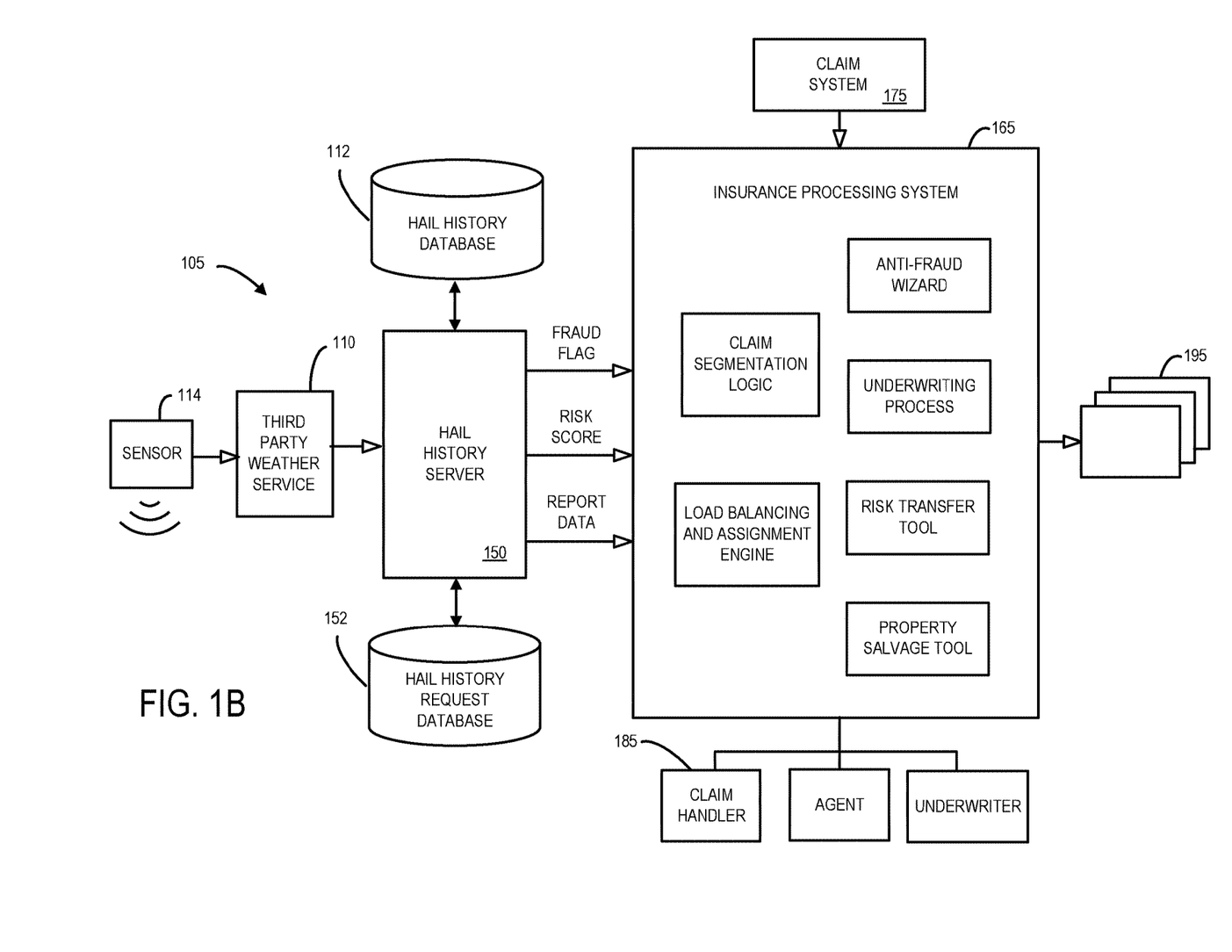
FIG. 1B is a block diagram of an insurance system according to some embodiments described herein.

Note that the system 100 of FIG. 1A is provided only as an example, and embodiments may be associated with additional elements or components. For example, FIG. 1B is a block diagram of an insurance system 105 according to some embodiments described herein. As before, the system 106 includes the hail history server 150 that may periodically receive hail information from the third party weather service 110 (e.g., on a daily basis). The hail history server 150 may, for example, receive information collected by the sensor 114 and store the information in a hail history database 112.

The hail history server 150 may interact with an insurance processing system 165. The insurance processing system 165 may, for example, handle underwriting decisions and/or process insurance claims received via a claim system 175. The insurance processing system 165 may interact with remote devices 185, such as devices 185 associated with an insurance claim handler, agent, or underwriter. Any of these devices 185 and/or the insurance processing system 165 itself might request historical hail evaluation information from the hail history server 150. According to some embodiments, information about received requests may be stored in the hail history request database 152. Response to the request, the hail history server 150 might access information in the hail history database 112 (e.g., associated with prior hail storms). The hail history server 150 may then evaluate that accessed information and transmit historical hail evaluation data, including a fraud flag, a risk score, and/or report data to the insurance processing system 165.

Figure 2:
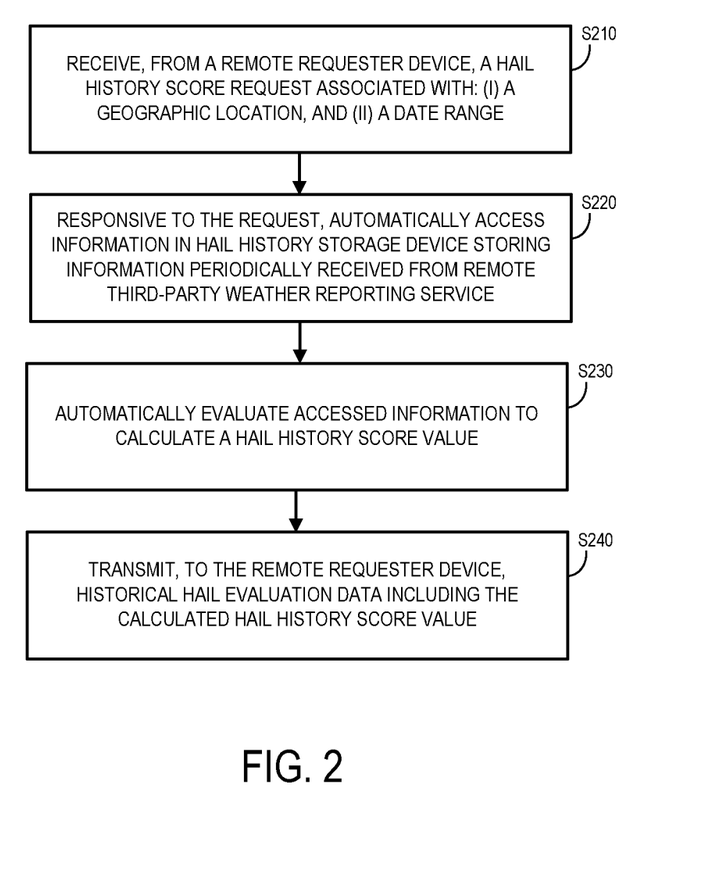
FIG. 2 illustrates a method that might be performed in accordance with some embodiments.

The insurance processing system 165 might use the historical hail evaluation data in connection with, for example, claim segmentation logic, insurance handler load balancing and assignment, an anti-fraud wizard (e.g., to tell an underwriter that a particular roof should be inspected from hail damage before issuing an insurance policy for that property), an underwriting process, a risk transfer tool, and/or a property salvage tool. According to some embodiments, the insurance processing system 165 may use the historical hail evaluation data to interact with external applications 195, such as a payment platform, underwriting engine, etc. FIG. 2 illustrates a method that might be performed by some or all of the elements of the systems 100, 105 described with respect to FIGS. 1A and 1B, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a hail history score request may be received from a remote requester device. The hail history score request may be associated with, for example, a particular geographic location (e.g., a postal address, a latitude and longitude, and/or a personal or business name) and/or a date range (e.g., between a date a roof was repaired and an end date). Note that the hail history score request may further be associated with a potential insurance policy (e.g., a new policy the insurer is considering), a renewal of an existing insurance policy, a commercial insurance policy, a homeowner's insurance policy, and/or an insurance claim (e.g., submitted in connection with an existing insurance policy).

Responsive to the received hail history score request, the hail history server may automatically access information in a hail history storage device at S220 based on the geographic location and date range. The hail history storage device may, for example, store data received from a remote third-party weather reporting service. At S230, the hail history server may automatically evaluate the accessed information to calculate a hail history score value (e.g., a numeric value or a risk category classification). For example, a number of risk points may be assigned to each of a plurality of hail sizes. In this case, the information from the remote third-party weather reporting service may be evaluated to determine a total number of risk points associated with the time period.

At S240, the hail history server may transmit to the remote requester device historical hail evaluation data (e.g., in the form of a hail history score report) including the calculated hail history score value. According to some embodiments, the historical hail evaluation data may also include lightning information, wind gust information, a fraud indication, underwriting information, and/or claim probability information. Note that that information about the historical hail evaluation data might also be transmitted to an email server, a workflow application, a report generator, a social media server, a calendar application, and/or a predictive model.

Figure 3:
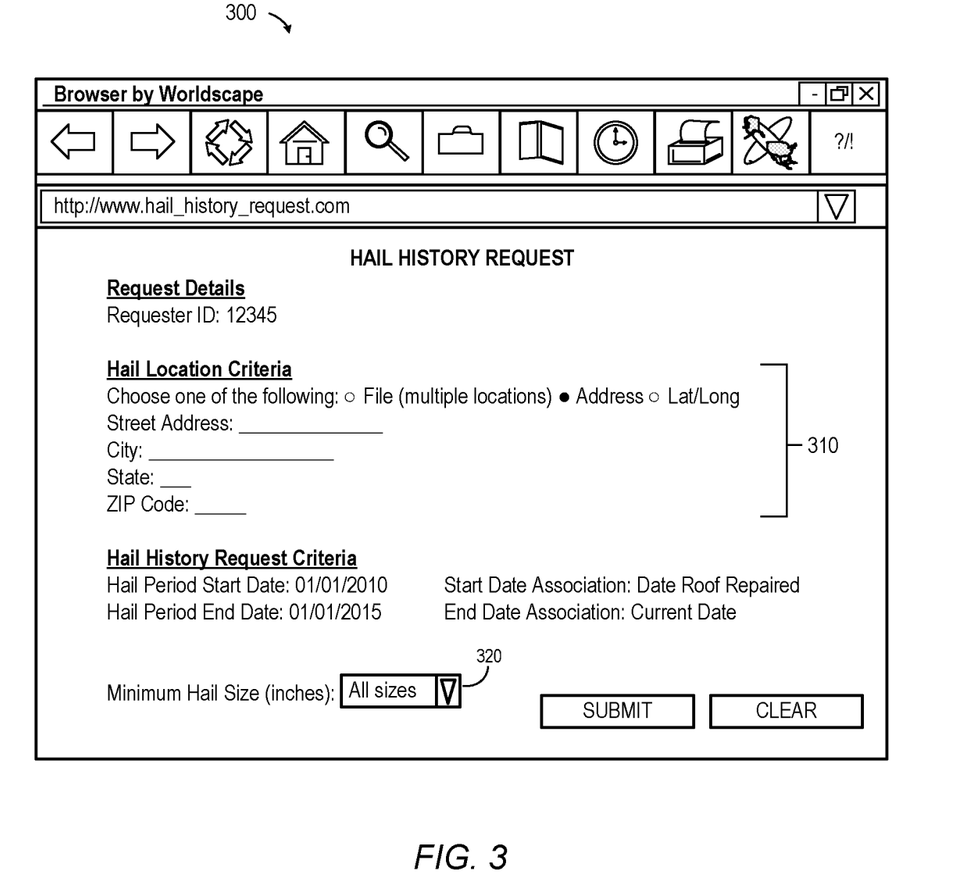
FIG. 3 illustrates a hail history report request user interface in accordance with some embodiments.

FIG. 3 illustrates a hail history report request user interface 300 in accordance with some embodiments. In particular, the user interface 300 includes request details (e.g., a requestor identifier, a request date and/or time, and/or a request identifier). The user interface 300 may also include hail location criteria 310, such as a street address, latitude and longitude information, and/or an electronic file (e.g., containing information about one or more properties). The user interface 300 may further include information about a date range, such as a period between a start date (or start association, such as when a home was built) and an end date (or end association such as an insurance policy or claim date). According to some embodiments, the hail history score request is further associated with a hail size range 320 (e.g., the requestor might indicate that he or she is only interested in hail events that had hail with a diameter of two or more inches).

Figure 4:
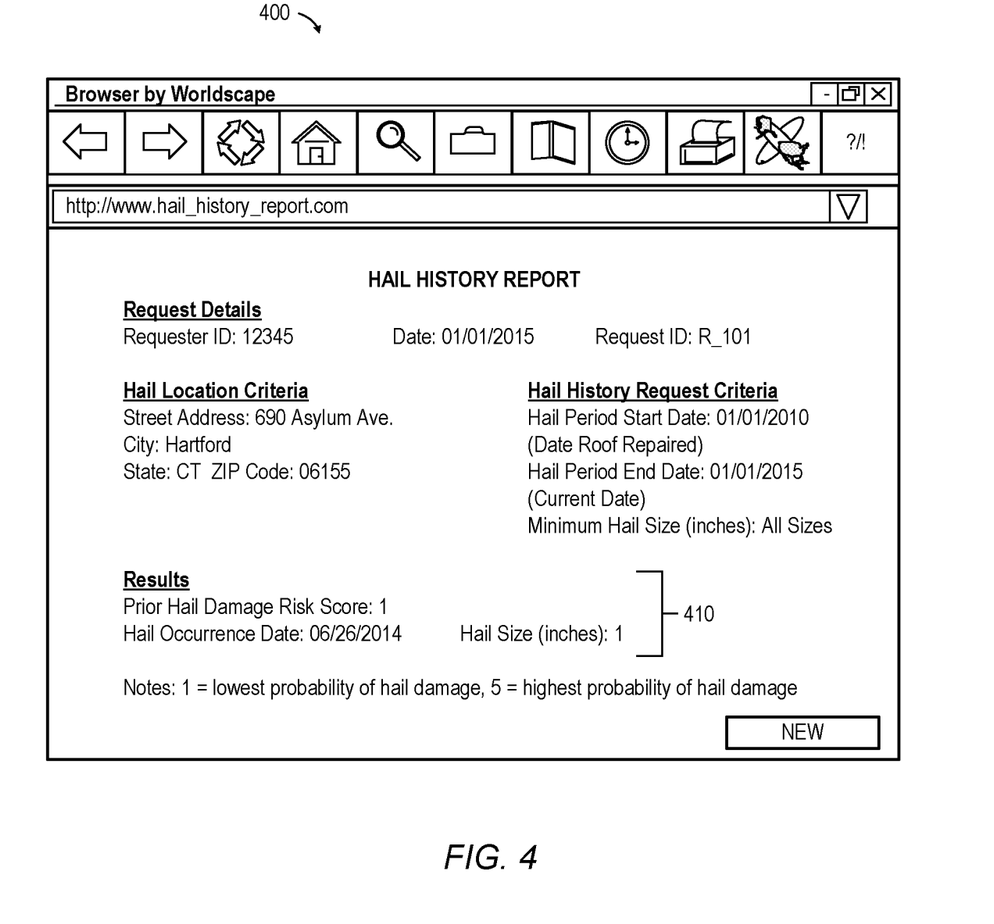
FIG. 4 illustrates a hail history report user interface according to some embodiments.

FIG. 4 illustrates a hail history report user interface 400 according to some embodiments. As before, the user interface 400 includes request details (e.g., a requestor identifier, a request date and/or time, and/or a request identifier), hail location criteria (e.g., a street address, latitude and longitude information, and/or an electronic file), information about a date range, and a hail size range (e.g., a minimum hail size). The hail history report user interface 400 further includes a results portion 410 displaying a prior hail damage risk score, one or more hail occurrence dates, and a hail size associated with each hail storm. An insurer might, for example, inspect all roofs for potential insurance policies when the risk score is 3 or higher.

Figure 5:
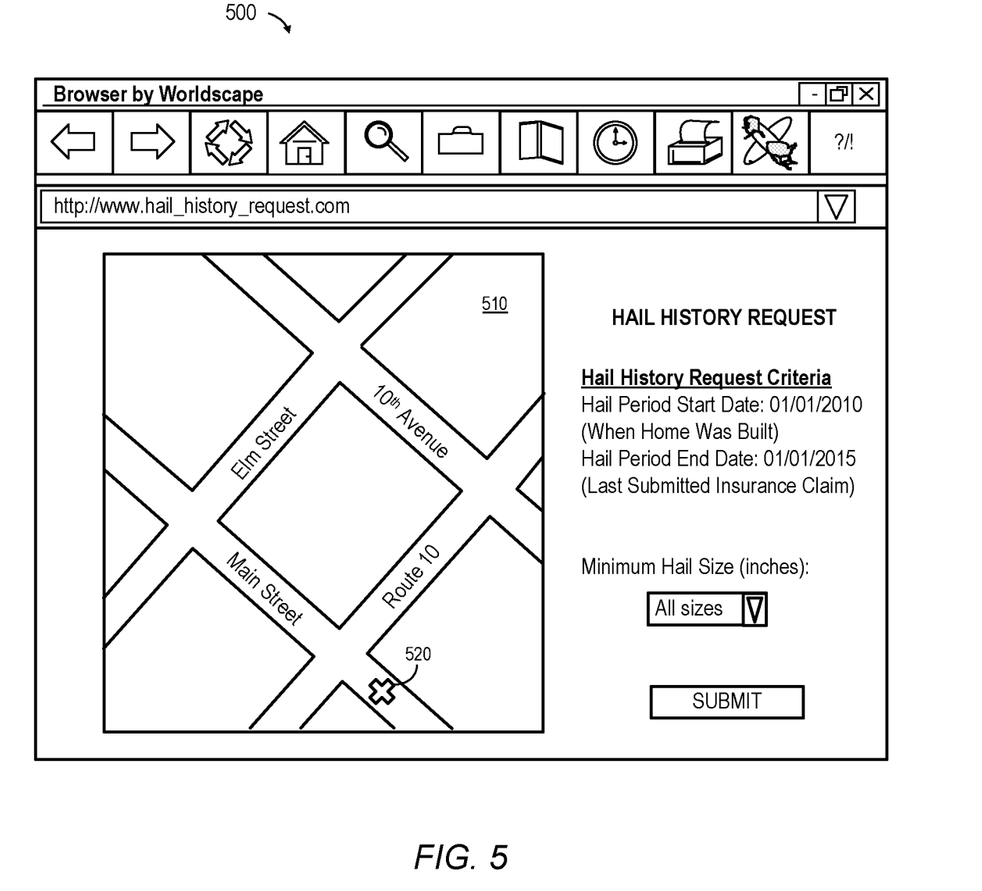
FIG. 5 illustrates a hail history report request user interface in accordance with another embodiment.

Note that the user interfaces 300, 400 are provided only as examples and actual embodiments may display more and/or different information. For example, FIG. 5 illustrates a hail history report request user interface 500 in accordance with another embodiment. In this case, a map area 510 may be used to define an area associated with the hail history request (e.g., by using a touchscreen to move a location icon 520 around the map area 510). As other example, a hail history request and/or report might include a roof type, a roof pitch, a building type, and/or solar panel information (e.g., all of which might be used in a risk score calculation).

Thus, embodiments described herein may help identify the potential for hail damage at a particular location based on an address or latitude/longitude point. According to some embodiments, access to such a tool may be limited to employees of an insurance entity who have access to intranet network. The tool might be used, for example, to help determine whether a property's roof should be inspected prior to binding coverage to avoid claims from preexisting damage. The tool might also validate reported dates of loss when claims are submitted. In some cases, the tool might not be suitable for determining the risk of future hail while writing business due to the potential for high hazard areas not being subject to hail in recent years (or low hazard areas having anomalous large hail a number of times in a short timeframe). According to other embodiments, the tool may facilitate the prediction of future hail risk using algorithms and/or predictive models.

The hail sizes may be determined by a third party service that uses a radar-based algorithm to calculate an estimated hail size. The answers from the tool may provide an indication of estimated hail size and/or damage based on assumptions about the radar data. Occasionally, there may be false negatives and positives, so final decisions may be made about a property using additional verifications. Note that the tool may depend on one or more calculations that are based on the number of occurrences and/or the size of hail at a particular location. If these calculations are modified for better performance, a Hail Damage Score Version may be incremented to reflect this change. If the algorithm for the historical hail data from a third party weather reporting service is updated, a Hail Data Version number may be updated. Either of these changes could result in hail history results being different than previously reported.

Some embodiments described herein may leverage internal enterprise geocoder when a postal address is used. There may be times when the geocoder will not place the address directly at the building and could give an answer that is not reflective of the true risk at the structure. Moreover, if a different geocoder is used somewhere in the process it may not give the same answer. Note that if the latitude/longitude is known from another source it may be used as an input to receive an answer with respect to an exact location.

Note that requests might be run on an ad hoc basis or batches might be processed (e.g., for 10,000 records). Large batches might be, for example, run after business hours since they may take several hours to process and could hold up other submitted requests. Batch requests may be, for example, processed one at a time in sequential order.

A Prior Hail Damage Scoring methodology might be, for example, developed using an insurer's claim statistics from historical hail events. Based off of an analysis in claim frequency, it may be determined, for example, that historically 3 inch hail corresponds to an approximate claim rate of X %, 2 inch hail corresponds to Y %, and 1 inch hail corresponds to a Z % claim frequency. Using these as the input to a scoring, an insurer might determine a preliminary scoring methodology to determine a score between 0 and 5.

A scoring methodology may convert the percentage chance of a claim per hail event to a point value and sum the points at a location to determine the risk of a claim and assigns a score as follows:

| |
|---|
| 1 inch Hail - X points |
| 2 inch Hail - Y points |
| 3+ inch Hail - Z points |

An overall score might be interpreted as follows: Score 0 (No Hail events recorded between start and end date); Score 1 (Cumulative points between a and b for preexisting hail damage based on historical claims data); Score 2 (Cumulative points between b and c for preexisting hail damage based on historical claims data); Score 3 (Cumulative points between c and d for preexisting hail damage based on historical claims data); Score 4 (Cumulative points between d and e for preexisting hail damage based on historical claims data); and Score 5 (Cumulative points e or greater for preexisting hail damage based on historical claims data). Thus, 3 occurrence of 1 inch hail, 1 occurrence of 2 inch hail and 1 occurrence of 3 inch could result in the calculation of similar (or not similar) risk scores.

Figure 6:
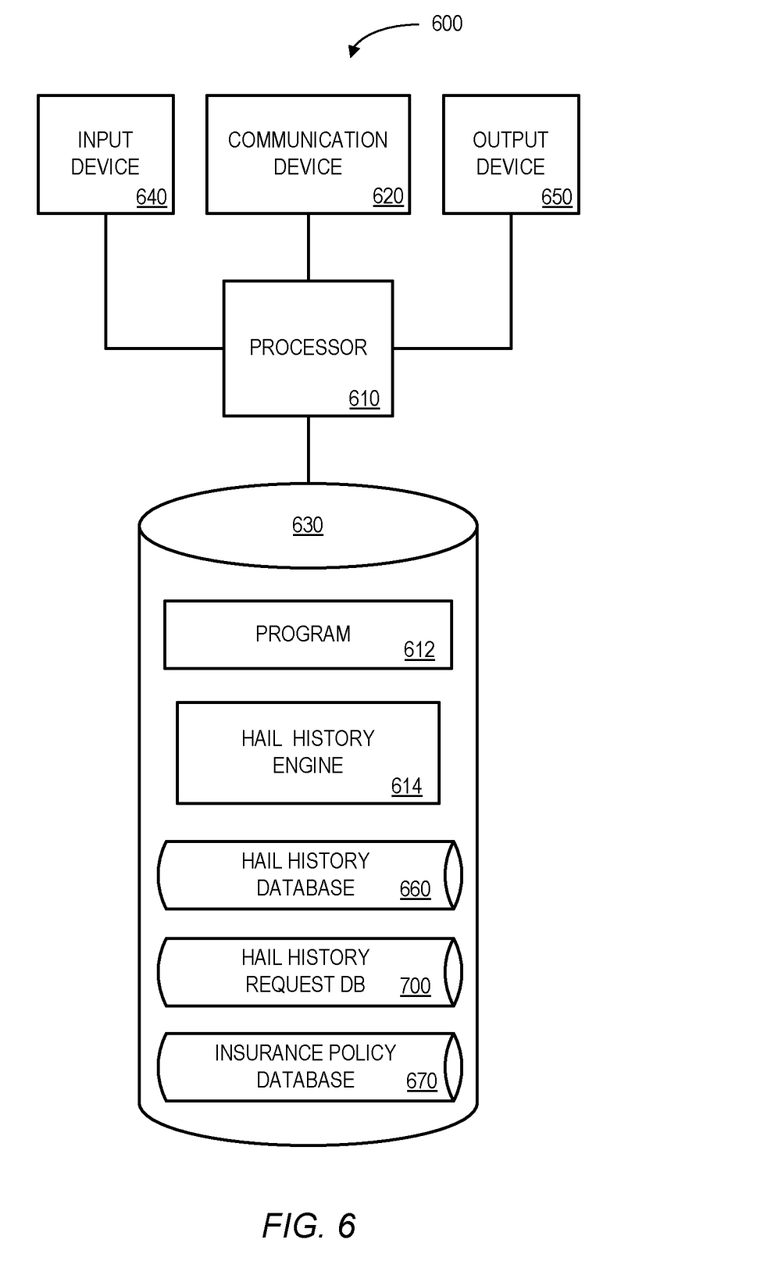
FIG. 6 is block diagram of a hail history tool or platform according to some embodiments of the present invention.

The embodiments described herein may be implemented using any number of different hardware configurations. For example, FIG. 6 illustrates a hail history platform 600 that may be, for example, associated with the system 100 of FIG. 1A. The hail history platform 600 comprises a processor 610, such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more remote requestor devices and/or weather reporting services. The hail history platform 600 further includes an input device 640 (e.g., a mouse and/or keyboard to enter information about hail risk scoring algorithms) and an output device 650 (e.g., to output reports regarding hail risk and/or insurance policies).

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 stores a program 612 and/or a hail history engine or application 614 for controlling the processor 610. The processor 610 performs instructions of the programs 612, 614, and thereby operates in accordance with any of the embodiments described herein. For example, the processor 610 may receive a hail history score request associated with a geographic location and a date range from a remote requester device. Responsive to the received hail history score request, the processor 610 may automatically access information in a hail history database 660 (e.g., storing information received from a remote third-party weather reporting service). Moreover, the processor 610 may automatically evaluate the accessed information to calculate a hail history score value. The processor 610 may then transmit, to the remote requester device, historical hail evaluation data including the calculated hail history score value.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the hail history platform 600 from another device; or (ii) a software application or module within the hail history platform 600 from another software application, module, or any other source.

In some embodiments (such as shown in FIG. 6), the storage device 630 includes the hail history database 660 (e.g., associated with past hail storms, claims, damages, etc.), a hail history request database 700 (e.g., indicating report requests that have been received and/or fulfilled) and an insurance policy database 670. An example of a database that may be used in connection with the hail history platform 600 will now be described in detail with respect to FIG. 7. Note that the database described herein is only one example, and additional and/or different information may be stored therein. Moreover, various databases might be split or combined in accordance with any of the embodiments described herein. For example, the hail history database 660 and/or hail history request database 700 might be combined and/or linked to each other within the hail history engine 614.

Figure 7:
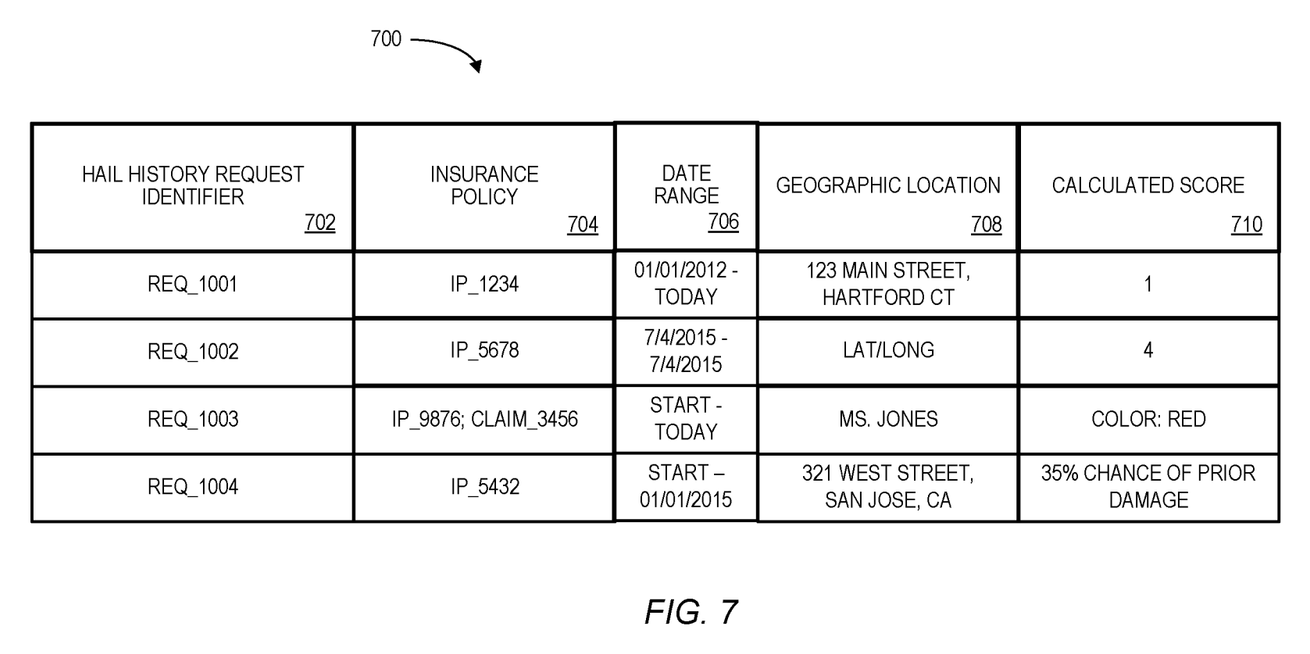
FIG. 7 is a tabular portion of a hail history database according to some embodiments.

Referring to FIG. 7, a table is shown that represents the hail history request database 700 that may be stored at the hail history platform 600 according to some embodiments. The table may include, for example, entries identifying requests for hail history reports. The table may also define fields 702, 704, 706, 708, 710 for each of the entries. The fields 702, 704, 706, 708, 710 may, according to some embodiments, specify: a hail history request identifier 702, an insurance policy 704, a date range 706, a geographic location 708, and a calculated score 710. The insurance policy database 700 may be created and updated, for example, based on information electrically received requestor devices and/or third party weather service reporting devices.

The hail history request identifier 702 may be, for example, a unique alphanumeric code identifying a request for a hail history report or score in connection with an insurance policy 704 during a specific date range 706. The geographic location 708 might comprise, for example, a street address, latitude/longitude or a name associated with a property. The calculated score 710 may comprise a numeric value or a risk classification associated with the historical hail evaluation data.

Figure 8:
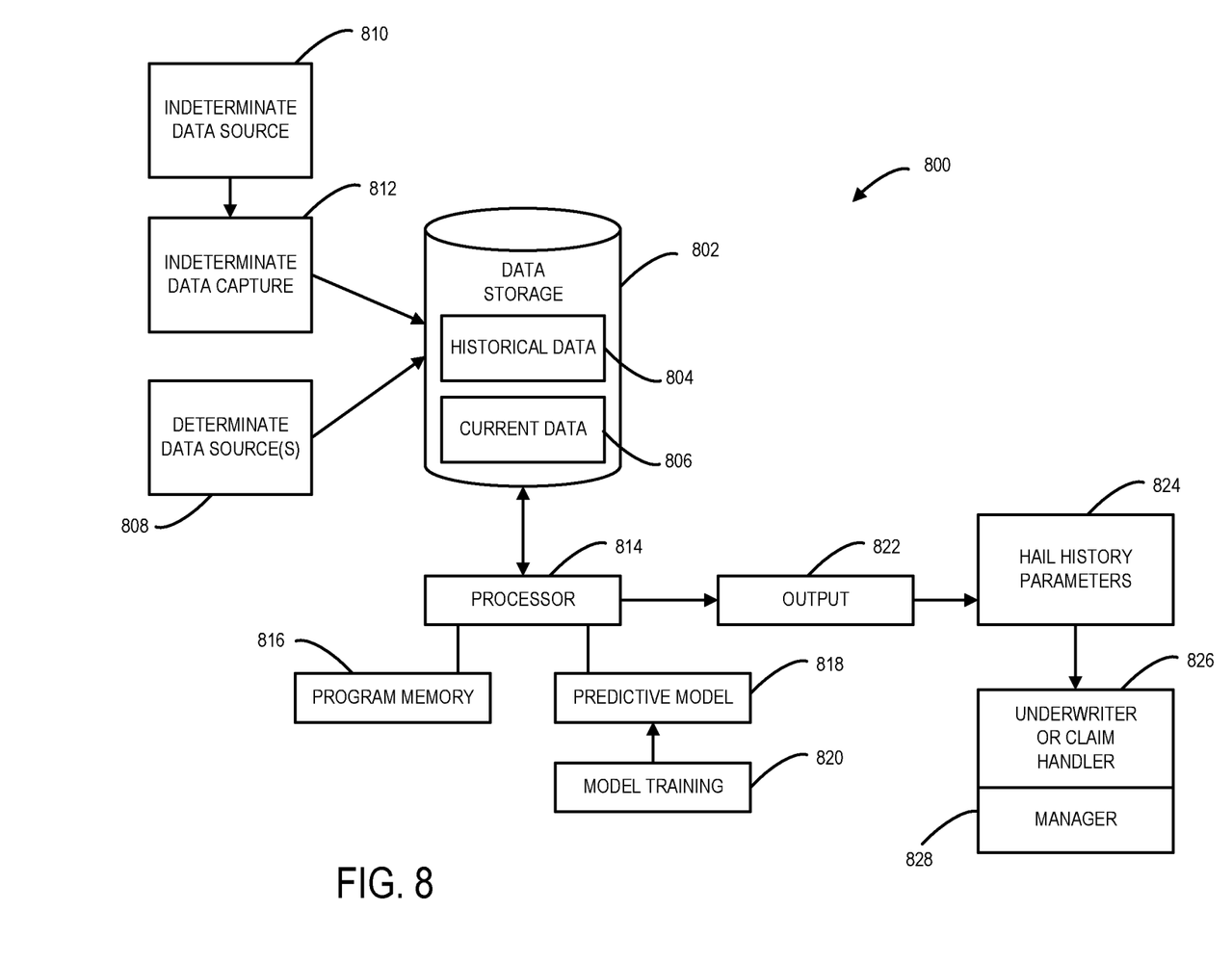
FIG. 8 is a partially functional block diagram that illustrates aspects of a computer system provided in accordance with some embodiments of the invention.

According to some embodiments, one or more predictive models may analyze historic weather and/or claim data to generate underwriting decisions, fraud detection programs, etc. Features of some embodiments associated with a predictive model will now be described by first referring to FIG. 8. FIG. 8 is a partially functional block diagram that illustrates aspects of a computer system 800 provided in accordance with some embodiments of the invention. For present purposes it will be assumed that the computer system 800 is operated by an insurance company (not separately shown) for the purpose of routing hail history information to underwriters, workflows, and/or claim handlers as appropriate.

The computer system 800 includes a data storage module 802. In terms of its hardware the data storage module 802 may be conventional, and may be composed, for example, by one or more magnetic hard disk drives. A function performed by the data storage module 802 in the computer system 800 is to receive, store and provide access to both historical claim transaction data (reference numeral 804) and current claim transaction data (reference numeral 806). As described in more detail below, the historical claim transaction data 804 is employed to train a predictive model to provide an output that indicates hail history data, and the current claim transaction data 806 is thereafter analyzed by the predictive model. Moreover, as time goes by, and results become known from processing current claim transactions, at least some of the current claim transactions may be used to perform further training of the predictive model. Consequently, the predictive model may thereby adapt itself to changing hail data patterns.

Either the historical claim transaction data 804 or the current claim transaction data 806 might include, according to some embodiments, determinate and indeterminate data. As used herein and in the appended claims, "determinate data" refers to verifiable facts such as the date of birth, age or name of a claimant or name of another individual or of a business or other entity; a type of injury, accident, sickness, or pregnancy status; a medical diagnosis; a date of loss, or date of report of claim, or policy date or other date; a time of day; a day of the week; a vehicle identification number, a geographic location; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about how an accident occurred.

The determinate data may come from one or more determinate data sources 808 that are included in the computer system 800 and are coupled to the data storage module 802. The determinate data may include "hard" data like a claimant's name, date of birth, social security number, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 810, and may be extracted from raw files or the like by one or more indeterminate data capture modules 812. Both the indeterminate data source(s) 810 and the indeterminate data capture module(s) 812 may be included in the computer system 800 and coupled directly or indirectly to the data storage module 802. Examples of the indeterminate data source(s) 810 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 812 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from their narrative text file notes.

The computer system 800 also may include a computer processor 814. The computer processor 814 may include one or more conventional microprocessors and may operate to execute programmed instructions to provide functionality as described herein. Among other functions, the computer processor 814 may store and retrieve historical claim transaction data 804 and current claim transaction data 806 in and from the data storage module 802. Thus the computer processor 814 may be coupled to the data storage module 802.

The computer system 800 may further include a program memory 816 that is coupled to the computer processor 814. The program memory 816 may include one or more fixed storage devices, such as one or more hard disk drives, and one or more volatile storage devices, such as RAM devices. The program memory 816 may be at least partially integrated with the data storage module 802. The program memory 816 may store one or more application programs, an operating system, device drivers, etc., all of which may contain program instruction steps for execution by the computer processor 814.

The computer system 800 further includes a predictive model component 818. In certain practical embodiments of the computer system 800, the predictive model component 818 may effectively be implemented via the computer processor 814, one or more application programs stored in the program memory 816, and data stored as a result of training operations based on the historical claim transaction data 804 (and possibly also data received from a third party weather reporting service). In some embodiments, data arising from model training may be stored in the data storage module 802, or in a separate data store (not separately shown). A function of the predictive model component 818 may be to determine appropriate fraud detection logic and/or underwriting processes. The predictive model component may be directly or indirectly coupled to the data storage module 802.

The predictive model component 818 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 800 includes a model training component 820. The model training component 820 may be coupled to the computer processor 814 (directly or indirectly) and may have the function of training the predictive model component 818 based on the historical claim transaction data 804 and/or hail history information. (As will be understood from previous discussion, the model training component 820 may further train the predictive model component 818 as further relevant data becomes available.) The model training component 820 may be embodied at least in part by the computer processor 814 and one or more application programs stored in the program memory 816. Thus the training of the predictive model component 818 by the model training component 820 may occur in accordance with program instructions stored in the program memory 816 and executed by the computer processor 814.

In addition, the computer system 800 may include an output device 822. The output device 822 may be coupled to the computer processor 814. A function of the output device 822 may be to provide an output that is indicative of (as determined by the trained predictive model component 818) particular fraud detection information and/or underwriting recommendations. The output may be generated by the computer processor 814 in accordance with program instructions stored in the program memory 816 and executed by the computer processor 814. More specifically, the output may be generated by the computer processor 814 in response to applying the data for the current claim transaction to the trained predictive model component 818. The output may, for example, be a true/false flag or a number within a predetermined range of numbers. In some embodiments, the output device may be implemented by a suitable program or program module executed by the computer processor 814 in response to operation of the predictive model component 818.

Still further, the computer system 800 may include hail history parameters module 824. The hail history parameters module 824 may be implemented in some embodiments by a software module executed by the computer processor 814. The hail history parameters module 824 may have the function of directing workflow based on the output from the output device 822. Thus the hail history parameters module 824 may be coupled, at least functionally, to the output device 822. In some embodiments, for example, the hail history parameters module 824 may direct workflow by referring, to a claim handler 826 or suitable platform, current claim transactions analyzed by the predictive model component 818 and found to be associated with various likelihoods of fraud. In some embodiments, these current claim transactions may be referred to case manager 828 who is associated with the claim handler 826 (or underwriter). The claim handler 826 may be a part of the insurance company that operates the computer system 800, and the case manager 828 might be an employee of the insurance company.

Thus, embodiments may provide an automated and efficient way to provide a hail history score report. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with hail history parameters might be implemented as dashboard displays and/or the databases described herein may be combined or stored in external systems).

Figure 9:
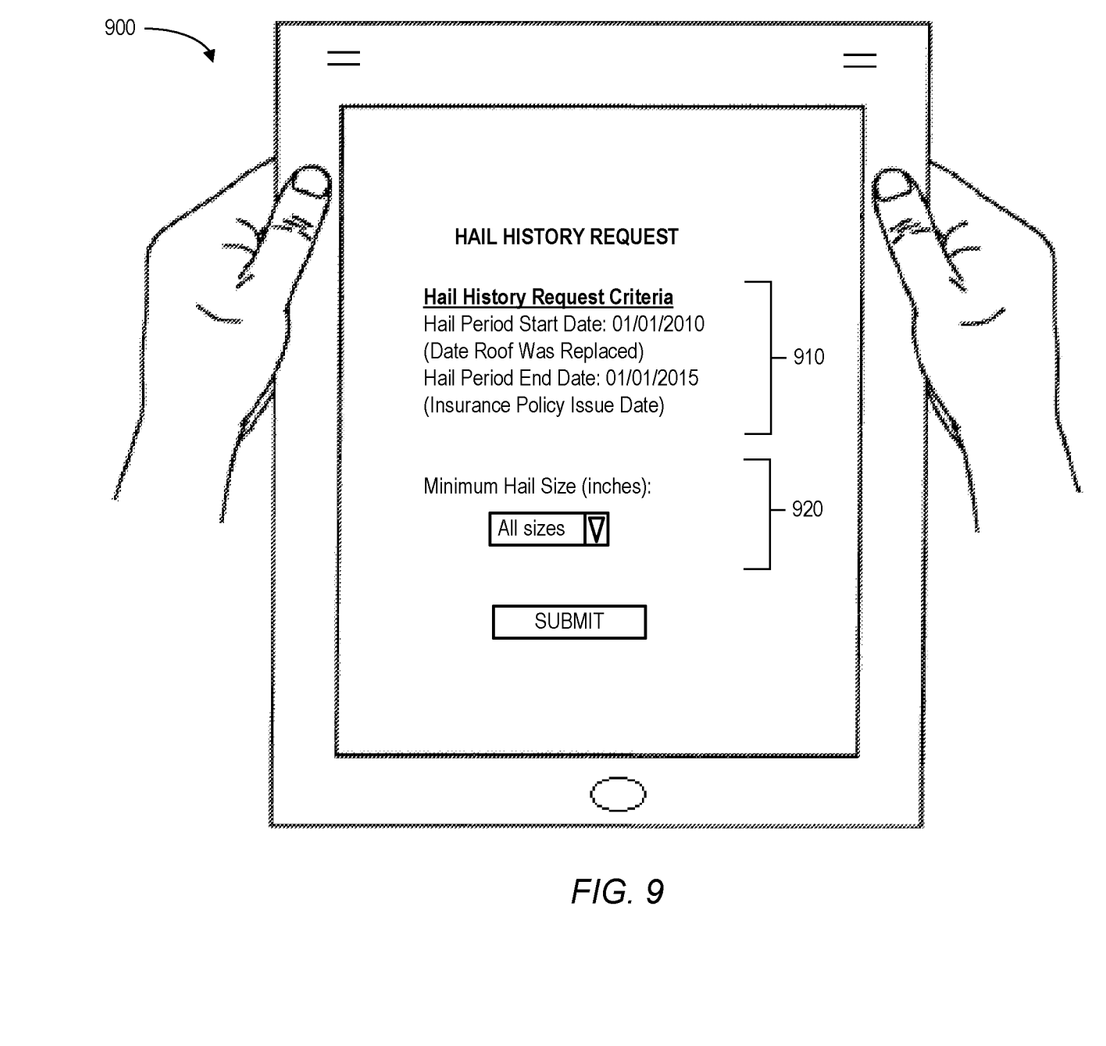
FIG. 9 illustrates a handheld hail history report request user display according to some embodiments.

Moreover, the displays 300, 400, 500 illustrated with respect to FIGS. 3 through 5 are only provided as examples, and embodiments may be associated with any other types of user interfaces. For example, FIG. 9 illustrates a handheld hail history user display 900 according to some embodiments. In this particular user display 900, hail history request criteria 910 and a minimum hail size 920 may be input by a user (e.g., via a touchscreen interface).

Note that the present invention provides significant technical improvements to facilitate hail history score reports. The present invention is directed to more than merely a computer implementation of a routine or conventional activity previously known in the industry as it significantly advances the technical efficiency, access and/or accuracy of hail history score reports by implementing a specific new method and system as defined herein. The present invention is a specific advancement in the areas of underwriting decisions and/or claim handling by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or third party weather systems, networks and subsystems. For example, in the present invention underwriting decisions and/or newly submitted claims may be analyzed and accurately and automatically facilitated.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system comprising:
a communication device to receive, from a remote requester device, a hail history score request; and
a hail data evaluation computer system including:
one or more hail history storage devices storing one or more hail history databases including: (i) radar-based hail data periodically received from a remote third-party weather reporting service, and (ii) historical hail request data; and
a hail history server processor in communication with the communication device and coupled to a risk mitigation computer system, wherein the hail history server processor is configured to:
periodically receive radar-based hail data from the third-party weather reporting service and store the radar-based hail data in the hail history database, wherein the radar-based hail data includes hail size data calculated from the radar-based hail data;
provide, to the remote requester device, data indicative of a hail history score request interface for display on the remote requester device, the hail history score request interface including input fields for determining a hail history score including:
a hail location selector for selecting a type of geographic location data to be provided in the hail history score request, wherein the selectable geographic location data types comprise one of address data and latitude/longitude data;
a hail period date range input field; and
a hail size selector for selecting a minimum hail size to include in the hail history score;
receive, via the hail history score request interface from the remote requester device, the hail history score request including a geographic location of the selected type, the hail period date range, and the selected minimum hail size;
obtain latitude/longitude data for the geographic location data comprising address data;
automatically access information in the one or more hail history databases based on the geographic location data comprising the latitude/longitude data, a date range corresponding to the hail period date range, and the minimum hail size,
automatically evaluate the accessed information to calculate a hail history score value and determine whether to generate a fraud flag corresponding to one of (i) an underwriting decision, and (ii) a claims processing decision, wherein the hail history score value is based on a number of hail events and a size of hail associated with each of the hail events experienced at the geographic location during the hail period date range, and
transmit, to the risk mitigation computer system, historical hail evaluation data including the calculated hail history score value and the fraud flag, responsive to a positive determination to generate the fraud flag.

2. The system of claim 1, wherein the hail location selector for selecting the type of geographic location data to be provided in the hail history score request further includes a selectable type comprising an electronic file including data for a plurality of locations; wherein the hail history server processor is further configured to, responsive to the received hail history score request including the geographic location comprising the electronic file including the data for the plurality of locations: obtain latitude/longitude data for geographic location data comprising address data; and batch process the data for each of the plurality of locations to calculate the hail history score value and corresponding fraud flags, based upon information in the hail history database, for each of the plurality of locations; and wherein the historical hail evaluation data transmitted to the remote requester device for each of the plurality of locations includes the fraud flag generated for each of the plurality of locations.

3. The system of claim 1, further comprising the risk mitigation computer system, the risk mitigation computer system comprising an anti-fraud wizard configured to, responsive to receipt of a fraud flag, implement a workflow process to (i) obtain, by an underwriting system, a physical inspection of a property in relation to the underwriting decision relating to the property, and (ii) process a property damage claim for the property, on a claims processing system, based upon a possibility that a hail event did not occur with respect to the geographic location.

4. The system of claim 1, wherein the date range is associated with at least one of: (i) a start date, (ii) an end date, (iii) a building date, (iv) a roof repair date, (v) a roof replacement date, (vi) a risk mitigation policy coverage date, and (vii) a risk mitigation policy claim date.

5. The system of claim 1, wherein the hail history score request further includes data indicative of at least one of: (i) a roof type, (ii) a roof pitch, (iii) a building type, and (iv) solar panel information.

6. The system of claim 1, wherein calculation of the hail history score value comprises: for each of a plurality of hail sizes, assigning a number of risk points, and evaluating the information from the remote third-party weather reporting service to determine a total number of risk points associated with a time period.

7. The system of claim 1, wherein the transmitted historical hail evaluation data further includes at least one of: (i) lightning data, (ii) wind gust data, (iii) a fraud indication data, (iv) underwriting information, and (v) claim probability data.

8. The system of claim 1, further comprising: a predictive model training component computer processor configured to train, based upon historical claim transaction data and the stored sensor-based hail data, one or more predictive models configured to evaluate hail claims data; the one or more predictive models, wherein the one or more predictive models are coupled to the one or more hail history storage devices, the risk mitigation computer system, and the hail history server processor; wherein the hail history server processor is configured to apply the one or more predictive models when automatically evaluating the accessed information to calculate the hail history score value and determine whether to generate the fraud flag corresponding to one of (i) the underwriting decision, and (ii) the claims processing decision; and wherein the one or more predictive models are continuously adapted to changing hail data patterns by activating the predictive model training component computer processor to update the predictive model with current hail claim data and hail claim processing results.

9. A computerized hail data evaluation method comprising:
periodically receiving, by a hail history server processor, radar-based hail data from a third-party weather reporting service and storing the radar-based hail data in a hail history database of a hail history storage device, wherein the radar-based hail data includes hail size data calculated from the radar-based hail data;
providing, by the hail history server processor, data indicative of a hail history score request interface for display on a remote requester device, the hail history score request interface including input fields for determining a hail history score including:
a hail location selector for selecting a type of geographic location data to be provided in a hail history score request, wherein the selectable geographic location types comprise one of address data and latitude/longitude data; a hail period date range input field; and
a hail size selector for selecting a minimum hail size to include in the hail history score;
receiving, via the hail history score request interface from the remote requester device, the hail history score request including geographic location of the selected type, the hail period date range, and the selected minimum hail size;
obtaining, by the hail history server processor, latitude/longitude data for geographic location data comprising address data;
automatically accessing, by the hail history server processor, information stored in the hail history database based on the geographic location data comprising the latitude/longitude data, and the date range, and the minimum hail size;
automatically evaluating, by the hail history server processor, the accessed information to calculate a hail history score value and determining whether to generate a fraud flag corresponding to one of (i) an underwriting decision, and (ii) a claims processing decision, wherein the hail history score value is based on a number of hail events and a size of hail associated with each of the hail events experienced at the geographic location during the hail period date range; and
transmitting, by the hail history server processor to a risk mitigation computer system, historical hail evaluation data including the calculated hail history score value, and the fraud flag, responsive to a positive determination to generate the fraud flag.

10. The method of claim 9, further comprising: training, by a predictive model training component computer processor based upon historical claim transaction data and the stored sensor-based hail data, one or more predictive models to evaluate hail claims data, wherein the one or more predictive models are coupled to the hail history storage device, the risk mitigation computer system, and the hail history server processor;
applying, by the hail history server processor, the one or more predictive models when automatically evaluating the accessed information to calculate the hail history score value and determining whether to generate the fraud flag corresponding to one of (i) the underwriting decision, and (ii) the claims processing decision; and continuously adapting the one or more predictive models based upon changing hail data patterns by activating the predictive model training component computer processor to update the predictive model with current hail claim data and hail claim processing results.

11. The method of claim 10, further comprising implementing, by an anti-fraud wizard of the risk mitigation computer system responsive to receipt of the fraud flag, a workflow process for (i) obtaining, by an underwriting system, a physical inspection of a property in relation to the underwriting decision relating to the property, and (ii) processing a property damage claim for the property, on a claims processing system, based upon a possibility that a hail event did not occur with respect to the geographic location.

12. The method of claim 9, wherein the hail location selector for selecting the type of geographic location data to be provided in the hail history score request further includes a selectable type comprising an electronic file including data for a plurality of locations; further comprising the steps of, responsive to the received hail history score request including the geographic location comprising the electronic file including the data for the plurality of locations: obtaining latitude/longitude data for geographic location data comprising address data; and batch processing the data for each of the plurality of locations to calculate the hail history score value and corresponding fraud flags, based upon information in the hail history database, for each of the plurality of locations; and wherein the historical hail evaluation data transmitted to the risk mitigation computer system for each of the plurality of locations includes the fraud flag generated for each of the plurality of locations.

13. The method of claim 12, wherein the date range is associated with at least one of: (i) a start date, (ii) an end date, (iii) a building date, (iv) a roof repair date, (v) a roof replacement date, (vi) a risk mitigation policy coverage date, and (vii) a risk mitigation policy claim date.

14. The method of claim 12, further comprising: automatically transmitting information about the historical hail evaluation data to: (i) an email server, (ii) a workflow application, (iii) a report generator, (iv) a social media server, (v) a calendar application, and (vi) a predictive model.

15. The method of claim 9, wherein the hail history score request is associated with at least one of: (i) a potential risk mitigation policy, (ii) a renewal of an existing risk mitigation policy, (iii) a commercial risk mitigation policy, (iv) a homeowner's risk mitigation policy, and (v) a risk mitigation claim.

16. The method of claim 9, wherein the hail history score request further includes data indicative of at least one of: (i) a roof type, (ii) a roof pitch, (iii) a building type, and (iv) solar panel information.

* * * * *